April 3, 1956
E. G. JOHNSON
2,740,930
ELECTRIC MOTOR
Filed Jan. 11, 1951
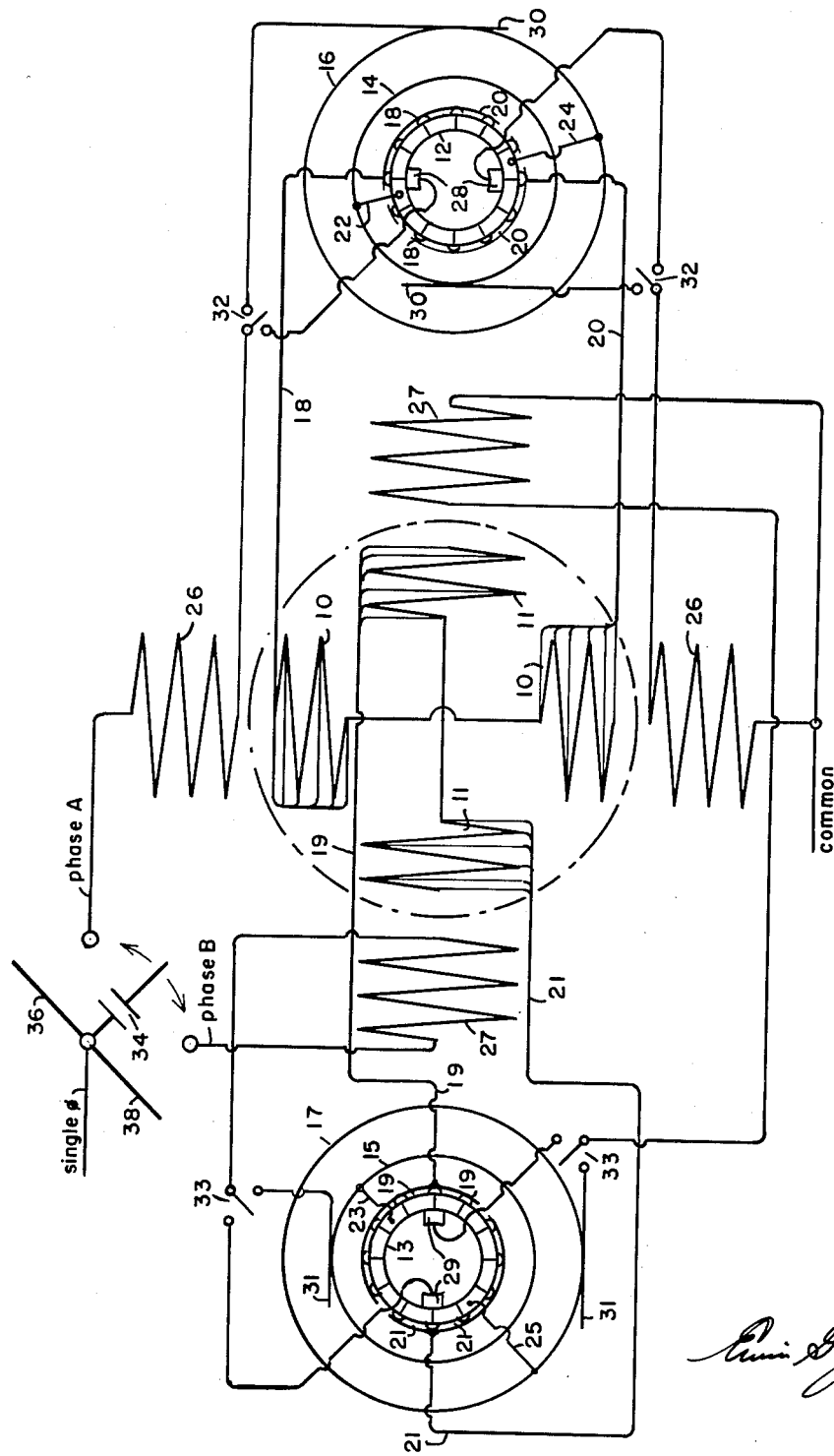

United States Patent Office 2,740,930
Patented Apr. 3, 1956

2,740,930
ELECTRIC MOTOR

Ervin G. Johnson, Oakland, Calif.; Eleanor De Haas Johnson, executrix of said Ervin G. Johnson, deceased Application January 11, 1951, Serial No. 205,579

5 Claims. (Cl. 318—186)

This application is a continuation in part of my copending application Serial No. 202,621, filed December 26, 1950, which application is hereby made a part hereof.

This invention relates to alternating current motors and it is one of the objects to provide an alternating current motor which can operate at a constant speed in rotations equal to the number of alternations in any unit of time divided by the number of pairs of poles in any phase in either the rotor or stator field, and which can operate as a varying speed or series type alternating current motor.

Other objects and advantages will be evident from the following specifications considered in connection with the accompanying schematic drawing, wherein a motor rotor is represented as having two electro-conductively distinct windings 10 and 11, two commutators 12 and 13, two sets of slip rings 14 and 16, and 15 and 17, with the several winding elements of the rotor connected to the commutator segments represented by the drawing lines 18 and 20, and 19 and 21. The drawing lines 18, 20, 19 and 21 actually represent all of the several commutator connections from the winding elements of the armature to the commutator segments. Winding 10 and its commutator 12 are substantially identical with windings 11 and commutator 13, and both armatures are in principle identical with direct and alternating current series motor armatures, but there is but one laminated iron core for both armatures, which are therefore regarded in many respects as but one armature. Considered as but one winding on the core, the armature is identical with well known series or universal motor windings and armatures. The well known duplex winding arrangements may be employed. As is suggested by the drawing layout, the commutators may be carried on the rotor at opposite ends of the core along with the respective slip ring pairs.

The rings 14 and 16 are respectively connected by tap connectors 22 and 24 to diametrically opposite points on the winding 10 as by securing one end of tap 22 to a commutator segment and tap 24 to the commutator segment diametrically opposite it. The slip rings 15 and 17 are similarly connected to winding 11 by taps 23 and 25, but the tap connections are made in a diameter of winding 11 which is perpendicular to the diameter of coil 10 in which taps 22 and 24 are connected.

The stator of the motor is represented as having field windings 26 and 27 arranged on axes perpendicular to each other about the rotor axis, sets of commutator brushes 28 and 29, sets of slip ring brushes 30 and 31, and control switches 32 and 33, with circuit connections as shown whereby two quadrature related supply voltages are, respectively, applicable to (1) the windings 10 and 26 in series with either the (a) brushes 28 and the segments of commutator 12, or (b) brushes 30, slip rings 14, 16, taps 22 and 24; and (2) the windings 11 and 27 in series with either the (a) brushes 29 and the segments of commutator 13, or (b) the brushes 31, slip rings 15 and 17 and taps 23 and 25.

Suitable gear is provided for physically separating brushes 28 and 29 from their respective commutators immediately before closure of the circuits including the slip rings, and for releasing them after opening the slip ring circuits; and this switching action of the brushes is employable in lieu of separate switches 32 and 33 by causing the brushes 28 and 29 to slide (a) axially to engage alternatively the commutators or the slip rings in the case of co-cylindric commutators and slip rings, or (b) radially in the case of coplanar slip rings and commutators.

Referring now to the operation it will be perceived that, with the commutator circuit closed and the slip ring circuit open in the case of either set of windings, the motor will operate as a series connected motor in the usual manner. The windings are so magnetically related that both sets of windings, identified as phase A and phase B respectively, produce torque in the same direction when phase displaced currents traverse them. Suitable provision on the commutator gear insures that reversal of rotation is obtainable by brush rotation in the usual way on single phase operation; and in addition suitable interchange of phase relation simultaneously with brush shift for plural phase operation. A capacitor 34 is arranged to produce the equivalent of two phase from single phase as well as reversal of rotation requirements on single phase, and single phase lines are identified by "single phase" and "common" legends on the drawing.

After reaching a high speed and upon reconnection to take the commutator segments out of circuit and place the slip rings in circuit with the two phase excitation of the windings, rotating magnetic fields of like speed and numbers of poles are produced in the rotor and stator windings, the speeds being respectively related to the rotor and stator as the speed datums. This connection is made only after the rotor has reached a speed about equal to the sum of the speeds of the two fields. The connections of the windings on the rotor are such that the direction of rotation of its magnetic field is opposite to its direction of rotation as produced by the commutator connections. Immediately upon such reconnection the rotor is accelerated or decelerated, depending upon whether the series connection has previously resulted in a speed above or below synchronous speed, so that the two magnetic fields lock together and the speed in rotations is thereupon and thereafter determined by and equal to the number of current reversals or alternations per unit of time divided by the number of pairs of poles per phase on the stator or rotor, with the drawing here showing but two poles or one pair.

With two poles as shown, and sixty cycle per second alternating current producing 120 alternations per second, the speed is 120 revolutions per second, or 7200 revolutions per minute. It is evident that the capacitor 34 in shifting from one circuit to the other effects reverse directions of rotation of the fields simultaneously on the rotor and the stator, and that its function is also to cause the single phase current supply to produce a leading current in whichever circuit of phase A or phase B it is included. Switch arms 36 and 38 are indicated for closing the circuit which does not include capacitor 34.

It will be evident that the principle hereof is equally applicable for four or more poles per phase, and to other pluralities of phases than two phases.

It is claimed:

1. A method of producing rotary electromotive action in a motor having a plural phase wound rotor and a like wound stator which method comprises: connecting the windings to accelerate the rotor from rest in accordance with the principles of operation of a series type motor; and, when the rotor reaches a synchronizing speed, energizing the respective phase windings with time-phase displaced alternating currents to produce in the stator and in the rotor respectively magnetic field rotations in the direction of rotor rotation and in a direction opposite to the direction of rotation.

2. An electric motor comprising, in combination: a stator core, a rotor core, at least two groups of windings equal in number on the cores respectively and so placed that the winding groups of each core when respectively simultaneously energized by time phase displaced alternating electric current exhibit phenomena of rotating magnetic fields in each core, means for connecting groups of each core to respective phase related sources of current in a manner to produce such rotating magnetic fields in each core, and means for connecting in series the windings on the stator and on the rotor to form series groups so that the so connected windings operate to produce series motor action in which there is created by means of one or more of said series connected groups on the rotor and stator one or more rotor magnetic fields which are substantially static in direction with respect to the stator so that the rotor speed builds up higher than the synchronous speed of the field in the stator windings when they are later energized with phase displaced currents.

3. An electric motor comprising, in combination: a rotor having a plurality of electro-conductively distinct windings angularly related about its axis, commutator and slip ring means connected with said rotor windings, a stator having a like plurality of windings arranged in like angular displacement about the axis of the rotor for cooperation with the rotor windings, brush means arranged for conducting current to and from said slip ring and commutator means, a power source, leads connecting said stator windings and said power source, means for connecting said power source to either said commutator means or said slip ring means thru said brush means so that said motor may operate as either a series or a synchronous motor.

4. In combination with an electric motor according to claim 3, and means for causing said motor to reverse its direction of rotation when energized by alternating current comprising a reactive impedance and means for applying the reactive impedance in circuit with one or another pair of rotor and stator windings.

5. A reversible motor according to claim 4, said reactive impedance comprising a capacitor.

References Cited in the file of this patent

UNITED STATES PATENTS

| | | |
|---|---|---|
| 416,191 | Tesla | Dec. 3, 1889 |
| 637,349 | Rosenqvist | Nov. 21, 1899 |
| 775,535 | Meissner | Nov. 22, 1904 |
| 871,513 | Lohr | Nov. 19, 1907 |
| 971,056 | Lohr | Sept. 27, 1910 |
| 1,204,169 | Lohr | Nov. 7, 1916 |
| 1,217,187 | Kimble et al. | Feb. 27, 1917 |
| 1,227,815 | Meyer | May 29, 1917 |
| 1,296,487 | Dudley | Mar. 4, 1919 |
| 1,506,446 | Rogers | Aug. 26, 1924 |
| 2,061,983 | Rossman | Nov. 24, 1936 |
| 2,084,178 | Angst | June 15, 1937 |

FOREIGN PATENTS

| | | |
|---|---|---|
| 319,684 | Great Britain | May 8, 1930 |